(12) United States Patent
Bowler et al.

(10) Patent No.: US 9,286,190 B2
(45) Date of Patent: *Mar. 15, 2016

(54) INSERTING IMPLICIT SEQUENCE POINTS INTO COMPUTER PROGRAM CODE TO SUPPORT DEBUG OPERATIONS

(71) Applicant: International Business Machines Corporation, Armonk, NY (US)

(72) Inventors: Christopher E. Bowler, Markham (CA); Chen Chen, Markham (CA); Reid T. Copeland, Markham (CA); Tommy U. Hoffner, Markham (CA); Tarique M. Islam, Kitchener (CA); Raúl E. Silvera, Woodbridge (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/889,506

(22) Filed: May 8, 2013

(65) Prior Publication Data

US 2014/0331210 A1 Nov. 6, 2014

Related U.S. Application Data

(63) Continuation of application No. 13/887,478, filed on May 6, 2013.

(51) Int. Cl.
*G06F 9/44* (2006.01)
*G06F 9/45* (2006.01)
*G06F 11/36* (2006.01)

(52) U.S. Cl.
CPC ............ *G06F 11/3636* (2013.01); *G06F 8/443* (2013.01); *G06F 8/4434* (2013.01); *G06F 11/362* (2013.01); *G06F 11/3628* (2013.01);
(Continued)

(58) Field of Classification Search
CPC ............ G06F 11/3628; G06F 11/3644; G06F 11/362; G06F 11/3664; G06F 11/3636; G06F 8/443; G06F 8/4434
See application file for complete search history.

(56) References Cited

U.S. PATENT DOCUMENTS 5,655,073 A 8/1997 Nishikado et al.
5,771,385 A 6/1998 Harper
(Continued)

OTHER PUBLICATIONS

IBM, XL Compiler Development, Code Optimization with IBM XL Compilers, 2004, pp. 1-22.*
(Continued)

*Primary Examiner* — Thuy Dao
*Assistant Examiner* — Mongbao Nguyen
(74) *Attorney, Agent, or Firm* — Cuenot, Forsythe & Kim, LLC

(57) ABSTRACT

Arrangements described herein relate to inserting implicit sequence points into computer program code to support debug operations. Optimization of the computer program code can be performed during compilation of the computer program code and, during the optimization, implicit sequence points can be inserted into the computer program code. The implicit sequence points can be configured to provide virtual reads of symbols contained in the computer program code when the implicit sequence points are reached during execution of the computer program code during a debug operation performed on the computer program code after the computer program code is optimized and compiled.

8 Claims, 4 Drawing Sheets

(52) U.S. Cl.
CPC ......... *G06F 11/3644* (2013.01); *G06F 11/3664* (2013.01)

(56) References Cited

U.S. PATENT DOCUMENTS

| | | | |
|---|---|---|---|
| 5,838,975 A * | 11/1998 | Abramson et al. ............ | 717/129 |
| 6,091,896 A | 7/2000 | Curreri et al. | |
| 6,256,777 B1 * | 7/2001 | Ackerman ................... | 717/129 |
| 8,656,380 B1 | 2/2014 | Sgeirsson et al. | |
| 2002/0188930 A1 | 12/2002 | Moser et al. | |
| 2003/0106045 A1 | 6/2003 | Arnold et al. | |
| 2004/0268183 A1 | 12/2004 | Haselden et al. | |
| 2005/0010912 A1 | 1/2005 | Adolphson et al. | |
| 2005/0177820 A1 * | 8/2005 | Mei ..................... G06F 11/3664 | 717/129 |
| 2006/0070042 A1 * | 3/2006 | Muratori ................ G06F 9/544 | 717/135 |
| 2006/0259827 A1 * | 11/2006 | Sohm et al. ..................... | 714/38 |
| 2006/0259899 A1 | 11/2006 | Cooper et al. | |
| 2007/0168972 A1 * | 7/2007 | Bates et al. .................. | 717/124 |
| 2007/0168984 A1 * | 7/2007 | Heishi et al. ................. | 717/124 |
| 2007/0168994 A1 | 7/2007 | Barsness et al. | |
| 2007/0250820 A1 | 10/2007 | Edwards et al. | |
| 2008/0092128 A1 * | 4/2008 | Corry et al. .................. | 717/158 |
| 2008/0127119 A1 * | 5/2008 | Kasman ........................ | 717/130 |
| 2008/0141226 A1 * | 6/2008 | Girouard ............. G06F 11/3664 | 717/128 |
| 2008/0155505 A1 * | 6/2008 | Lin ........................ G06F 11/362 | 717/124 |
| 2008/0209401 A1 * | 8/2008 | Fanning .............. G06F 11/3628 | 717/124 |
| 2009/0037887 A1 * | 2/2009 | Chavan ......................... | 717/128 |
| 2009/0064102 A1 | 3/2009 | Barcia et al. | |
| 2009/0138859 A1 * | 5/2009 | Chen .................. G06F 11/3461 | 717/131 |
| 2010/0050157 A1 | 2/2010 | Daniel | |
| 2010/0153693 A1 * | 6/2010 | Stall et al. ..................... | 712/229 |
| 2010/0162217 A1 * | 6/2010 | Morrison ............ G06F 11/3628 | 717/129 |
| 2011/0099538 A1 | 4/2011 | Naidu Pujala et al. | |
| 2011/0145797 A1 * | 6/2011 | Maddipatla ................... | 717/129 |
| 2011/0271259 A1 * | 11/2011 | Moench .............. G06F 11/3628 | 717/129 |
| 2012/0030652 A1 * | 2/2012 | Jelinek ..................... G06F 9/44 | 717/124 |
| 2012/0030660 A1 * | 2/2012 | McGrath ................. G06F 8/443 | 717/152 |
| 2012/0036501 A1 * | 2/2012 | Evensen et al. ............... | 717/128 |
| 2013/0019227 A1 * | 1/2013 | Chiu ................... G06F 11/3628 | 717/125 |
| 2013/0019228 A1 * | 1/2013 | Bates ........................... | 717/129 |
| 2013/0031534 A1 | 1/2013 | Bates | |
| 2013/0036403 A1 * | 2/2013 | Geist ............................ | 717/125 |
| 2013/0104107 A1 | 4/2013 | De Smet et al. | |
| 2013/0111451 A1 * | 5/2013 | Che .................... G06F 11/3476 | 717/128 |
| 2013/0152054 A1 * | 6/2013 | Bates ................. G06F 11/3636 | 717/129 |
| 2014/0033178 A1 * | 1/2014 | Sasikumar .................... | 717/125 |
| 2014/0331215 A1 | 11/2014 | Bowler et al. | |

OTHER PUBLICATIONS

Fabien Gaucher, Automatic State Reaching for Debugging Reactive Programs, 2003, pp. 1-15.*
Naveen Kumar, Tdb: A Source-level Debugger for Dynamically Translated Programs, 2005, pp. 1-10.*
Robert Hood, Support for Debugging Automatically Parallelized Program, 2000, pp. 1-12.*
Chen, D.C. et al., "A Compiler Option That Helps Debug Optimized Code," [online] IBM Corporation © 2012, Jul. 10, 2012, retrieved from the Internet: < http://www.ibm.com/developerworks/rational/library/debug-optimized-code-compiler-option/>, 6 pgs.
Hoffner, T. et al., "Debugging Optimized Code with Latest IBM XL C/C++ and XL Fortran Compilers," [online] IBM Corporation © 2012, Dec. 14, 2012, retrieved from the Internet: <http://ibmsystemsmag.com/aix/tipstechniques/applicationdevelopment/debug_xl_compilers/" 6 pgs.
Bruening, D. et al., "An Infrastructure for Adaptive Dynamic Optimization." In 2003 Int'l. Sym. on Code Generation and Optimization, CGO 2003, pp. 265-275, IEEE, 2003.
Holzle, U. et al., "Debugging Optimized Code with Dynamic Deoptimization," In ACM SIGPLAN Notices, Jul. 1, 1992, vol. 27, No. 7, pp. 32-43, ACM.
Bhansali, S., et al., "Framework for Instruction-level Tracing and Analysis of Program Executions," In Proc. of the 2nd Int'l. Conf. On Virtual Execution Environments, Jun. 14, 2006, pp. 154-163, ACM.
U.S. Appl. No. 13/887,478, Non-Final Office Action, Sep. 17, 2014, 19 pg.
U.S. Appl. No. 13/887,478, Non-Final Office Action, Mar. 19, 2015, 18 pg.
U.S. Appl. No. 13/887,478, Final Office Action, Aug. 19, 2015, 12 pg.
U.S. Appl. No. 13/887,478, Notice of Allowance, Nov. 3, 2015, 12 pg.

* cited by examiner

200

```
        int g;
        void fun1(int a, int *p)
210     {
  ↘     int b = 0;      // a sequence point here reads "g", "a", "b", "p" and "*p".
                        // Note "c" is not visible to the user here.
220     {
  ↘        int c = a + b;    // a sequence point here reads "g", "a", "b", "c",
230                          // "p" and "*p".
  ↘        g = g * c + *p;   // a sequence point here reads "g", "a", "b", "c",
                             // "p" and "*p".
        }
        }
```

```
330
  ↘    int square(int x) { return x * x; }
310 ↘  int foo() {
    ↘    int i = 5;
         return square(i);
320    }
```

INSERTING IMPLICIT SEQUENCE POINTS INTO COMPUTER PROGRAM CODE TO SUPPORT DEBUG OPERATIONS

CROSS-REFERENCE TO RELATED APPLICATIONS

This application is a continuation of U.S. application Ser. No. 13/887,478 titled INSERTING IMPLICIT SEQUENCE POINTS INTO COMPUTER PROGRAM CODE TO SUPPORT DEBUG OPERATIONS, and filed May 6, 2013, the entirety of which is fully incorporated herein by reference.

BACKGROUND

An optimizing compiler is a compiler configured to optimize attributes of an executable computer program code to achieve a particular goal. One optimization technique commonly implemented is to optimize a computer program to minimize the amount of time it takes to execute the computer program during operation. Another optimization technique commonly implemented is to minimize the amount of memory utilized by the computer program during operation.

There are several levels of optimization that a user can specify when compiling a computer program. For example, the GNU Compiler Collection (GCC) specifies a number optimization levels. With level 0 (o0), no optimization is performed. With level 1 (o1) optimization, most common forms of optimization that do not require any speed-space tradeoffs are implemented. Accordingly, the executable typically does not increase in size. With level 2 (o2) optimization, in addition to the optimizations used in level 1, further optimizations are implemented, including instruction scheduling. Again, the executable typically does not increase in size when level 2 optimization is used. With level 3 (o3) optimization, in addition to the optimizations used in level 1 and level 2, more expensive optimizations (in terms of memory usage), such as function inlining, are used. Level 3 optimization may increase the speed of the resulting executable, but also may increase its size. Under some circumstances, for example where these optimizations are not favorable, level 3 optimization may actually cause a program to execute slower. Other optimizations, such as loop-unrolling and size reduction optimizations sometimes also are used.

BRIEF SUMMARY

One or more embodiments disclosed within this specification relate to inserting implicit sequence points into computer program code to support debug operations.

One embodiment can include a method of inserting implicit sequence points into computer program code to support debug operations. The method can include performing, using a processor, optimization of the computer program code during compilation of the computer program code and, during the optimization, inserting implicit sequence points into the computer program code. The implicit sequence points are configured to provide virtual reads of symbols contained in the computer program code when the implicit sequence points are reached during execution of the computer program code during a debug operation performed on the computer program code after the computer program code is optimized and compiled.

BRIEF DESCRIPTION OF THE SEVERAL VIEWS OF THE DRAWINGS

FIG. 2 presents an example of a portion of computer program code in which implicit sequence points can be inserted into the computer program code.

FIG. 3 presents another example of a portion of computer program code in which implicit sequence points can be inserted into the computer program code.

FIG. 4 presents another example of a portion of computer program code in which implicit sequence points can be inserted into the computer program code.

DETAILED DESCRIPTION

Figure 1:
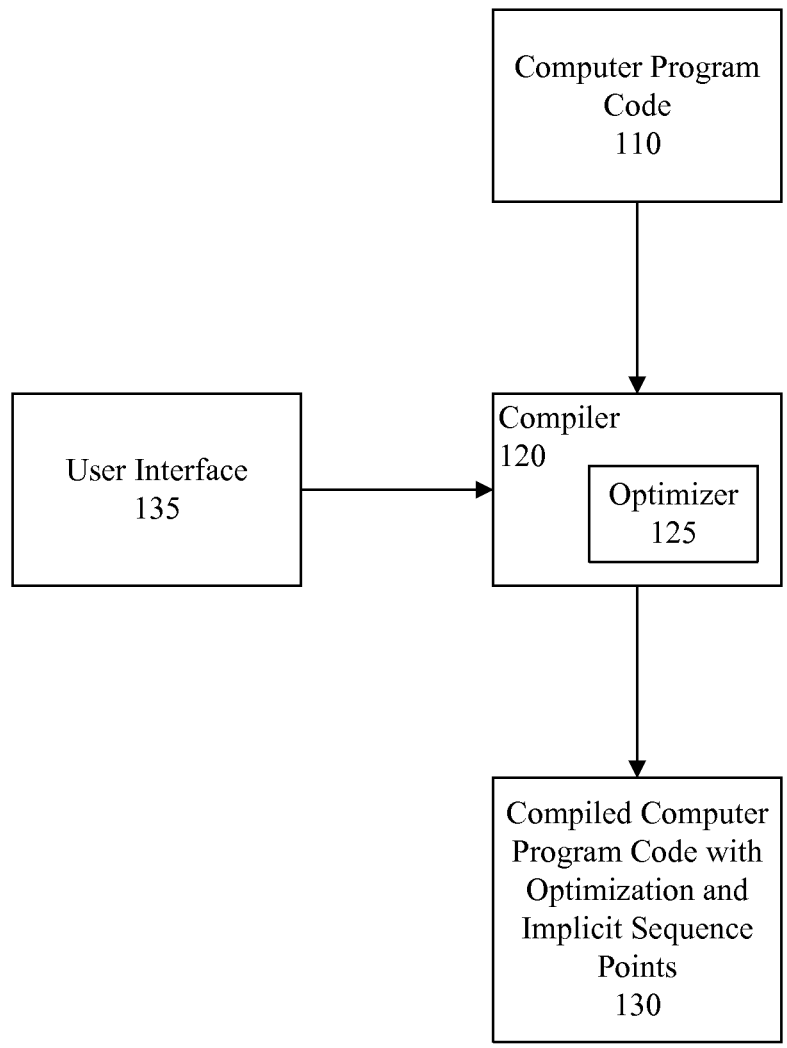
FIG. 1 is a block diagram illustrating a system for inserting implicit sequence points into computer program code in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to inserting implicit sequence points into computer program code to support debug operations. Typically, in order to debug a computer program, the computer program is compiled without optimization. When a computer program is compiled with optimization, the optimized computer program code may not maintain the sequential execution of the original source code and machine state at any point in the original source code may not be well defined. The present arrangements are directed to the insertion of implicit sequence points into computer program code in a manner that supports debug operations on compiled computer program code while retaining at least most of the runtime performance improvements of optimization technology. As used herein, the term "implicit sequence point" means a sequence point not explicitly defined by an operating language in which computer program code is written.

By providing the computer program both with debug support and optimization in accordance with the present arrangements, users quickly may be able to find regions of transformed code that cause failures or errors during execution of the compiled computer program code. Further, the compiled computer program code typically may achieve at least 70%-80% of the runtime performance of level 2 (o2) optimization for C, C++ and Fortran Spec2006 benchmarks, while retaining a valid view of the computer program in a debugger at the set of sequence points.

FIG. 1 is a block diagram illustrating a system 100 for inserting implicit sequence points into computer program code 110 in accordance with one embodiment disclosed within this specification. The system can include a compiler 120 that receives the computer program code 110 as source code, and compiles the computer program code 110 to transform the computer program code 110 from a programming language to a target language to generate compiled computer program code 130 (e.g., object code), and thus create an executable program from the computer program code 110. During compilation, the compiler 120, for example using an optimizer 125, can perform at least one level of optimization on the computer program code 110. For example, the compiler 120 can optimize the computer program code 110 to reduce an amount of time required to execute the compiled computer program code 130 and/or optimize the computer program code 110 to reduce an amount of memory utilized by the compiled computer program code 130 at run time. As noted, however, there are several levels of optimization that can be performed on the computer program code 110, and the invention is not limited in this regard.

During optimization, the compiler 120 (e.g., using the optimizer 125) can insert into the computer program code 110 implicit sequence points. The implicit sequence points can be configured to provide virtual reads of symbols contained in the compiled computer program code 130 when requested. As used herein, the term "virtual read" means an identification of where a value for a symbol is stored in memory. For example, when the implicit sequence points are reached during execution of the compiled computer program code 130 during a debug operation performed on the compiled computer program code 130, the debugger can request the values of symbols corresponding to the sequence point. Since the memory location where the values of the symbols is known via the virtual reads, the values can be accessed and presented to a user, for example via the debugger.

The implicit sequence points can be inserted into the computer program code 110 at locations in the computer program code 110 where it is desired that a view of the computer program remain valid. To ensure the view remains valid, when the computer program code 110 is compiled, the compiler 120 can translate the implicit sequence points and model the implicit sequence points as virtual reads of the user visible symbols at the implicit sequence points. In this regard, the compiler 120 can be constrained from performing undesired transformations of the computer program code 110 to ensure user visible symbols retain correct values at the implicit sequence points, for example using processes otherwise used to retain correct program semantics.

The implicit sequence points further can provide virtual reads of indirect operations performed by the computer program code 110 (i.e., during execution of the compiled computer program code 130). The indirect operations can be operations that process one or more variables not specifically assigned in the computer program code 110. For example, in addition to reading user visible symbols, the implicit sequence points can provide virtual reads of indirect operations (e.g., shadow symbols) used by the computer program code 110. The values of the shadow symbols can be accessed through identification of pointers which point to named and/or unnamed symbols/variables. For example, the values stored at a memory locations identified by the pointers can be read. In one arrangement, one or more of the implicit sequence points can read not only values for user visible symbols and/or shadow symbols corresponding to the place in the computer program code 110 where the implicit sequence points are placed, but also values for other symbols and/or shadow symbols used in the computer program code 110. Reading such other symbols can simplify a debug analysis performed on the compiled computer program code 130.

Further, a list of symbols to be referenced by virtual reads can be provided for one or more of the implicit sequence points. Indeed, a unique symbol set can be provided for each of the implicit sequence points, and the implicit sequence points can be modeled as virtual reads of the listed symbols/shadow symbols. Thus, not all symbols/shadow symbols need be handled as if they were to be read. Instead, implicit sequence points need only be provided for the listed symbols/shadow symbols. This can reduce the memory consumption used by the compiled computer program code 130 when executed, as well as reduce execution time.

In one arrangement, the locations where the implicit sequence points are inserted into the computer program code 110 can be specified by a user, for example in response to a user input received via the compiler 120 specifying compile options for the computer program code 110. Such user input can be received via a user interface 135 provided for the compiler 120, or another suitable user interface. In another arrangement, the locations where the implicit sequence points are inserted can be determined by one or more policies and, for example, may be controlled through user selectable compiler options. For example, implicit sequence points can be inserted at the beginning of each user statement in the computer program code 110.

In a further arrangement, the compiler 120 can automatically determine, based on one or more policies, locations in the computer program code 110 where a user would want (or likely would want) the implicit sequence points to be placed into the computer program code based on a user experience provided by the computer program code 110, and automatically insert the implicit sequence points at those locations. For example, if the computer program code 110 performs a calculation on parameter values that affect the user experience, an implicit sequence point can be inserted into the computer program code 110 at the beginning of statement which performs the calculation. The number of implicit sequence points inserted into the computer program code 110 can be a selected value within a predetermined range of values, though this need not be the case. For example, the user can be presented the predetermined range of values and prompted to select one of the values.

When the debug operation is performed on the compiled computer program code 130, a debugger can stop execution on the compiled computer program code 130, at least temporarily, at each implicit sequence point. In this regard, each implicit sequence point can indicate a point in the compiled computer program code 130 where execution is to be stopped, at least temporarily, during debug operations. When the debugger stops at a sequence point, user visible symbols and/or shadow symbols hold the respective values in a same manner the user visible symbols and shadow symbols would hold the respective values without optimization being performed on the computer program code 110, and the symbols can be viewed by a user (e.g., debugger can present such values to the user).

Further, the compiled computer program code 130 can be configured to enable user modification of one or more values of the symbols during the debug operation, for example by making a virtual read also a virtual write into a virtual data store. In this regard, the compiler 120 can implicitly insert virtual writes to user visible symbols between implicit sequence points so that optimization of the computer program code 110 includes providing in the compiled computer program code 130 the ability for a user to modify one or more symbols in the compiled computer program code 130, via the debugger, wherein such ability is not provided in the computer program code 110. Thus, when execution of the compiled computer program code 130 stops at a particular implicit sequence point, the values of symbols can be presented to a user, and the user can be provided the opportunity to modify one or more such values in the compiled computer program code 130 during the debug operation. Execution of the compiled computer program code 130 can again commence from that implicit sequence point in response to the debugger receiving a user input indicating to the debugger to continue execution.

In view of the foregoing, the present arrangements provide a problem determination technique that can aid the investigation of application failures when the computer program code 110 is compiled, with optimization, into the computer program code 130.

FIG. 2 presents an example of a portion 200 of computer program code 110 in which implicit sequence points can be inserted into the computer program code 110. User visible symbols can be chosen by the compiler (e.g., via a language translator) based on the rules of the specific programming language being compiled. For indirect operations, existing side effect information that is generated by the compiler can be used to support optimization. For instance, in this example, "*p" effectively can be a symbol that represents the set of all symbols that potentially can be accesses through a pointer "p." The contents of that set can be computed by the compiler. In one arrangement, "*pp" can be natively defined to represent all symbols in the computer program code, or alias refinement techniques can be used to refine the set "*pp" for each implicit sequence point.

When the computer program code 110 is compiled, implicit sequence points can be inserted at the beginning of each of the statements 210, 220, 230. In this example, a sequence point inserted at the beginning of the statement 210 can provide virtual reads of the symbols "g", "a", "b", "p" and "*pp". At this sequence point, "c" would not be visible to the user. A sequence point inserted at the beginning of the statement 220 can provide virtual reads of the symbols "g", "a", "b", "c", "p" and "*pp". A sequence point inserted at the beginning of the statement 230 also can provide virtual reads of the symbols "g", "a", "b", "c", "p" and "*p".

FIG. 2 presents an example of a portion 200 of computer program code in which implicit sequence points can be inserted into the computer program code. User visible symbols can be chosen by the compiler (e.g., via a language translator) based on the rules of the specific programming language being compiled. For indirect operations, existing side effect information that is generated by the compiler can be used to support optimization. For instance, in this example, "*pp" effectively can be a symbol that represents the set of all symbols that potentially can be accesses through a pointer "p." The contents of that set can be computed by the compiler. In one arrangement, "*pp" can be natively defined to represent all symbols in the computer program code, or alias refinement techniques can be used to refine the set "*pp" for each implicit sequence point.

When the computer program code is compiled, implicit sequence points can be inserted at the beginning of each of the statements 210, 220, 230. In this example, a sequence point inserted at the beginning of the statement 210 can provide virtual reads of the symbols "g", "a", "b", "p" and "*pp". At this sequence point, "c" would not be visible to the user. A sequence point inserted at the beginning of the statement 220 can provide virtual reads of the symbols "g", "a", "b", "c", "p" and "*pp". A sequence point inserted at the beginning of the statement 230 also can provide virtual reads of the symbols "g", "a", "b", "c", "p" and "*pp". Notwithstanding, a list of symbols that are to be read at each sequence point can be provided to pessimize the set of symbols (e.g., reduce the number of symbols that are read) in order to reduce memory consumption used during execution of the compiled computer program code. For example, C and C++ implementations can provide unique symbol sets for the implicit sequence points on a per function basis. As noted, the compiler (e.g., via the optimizer) can translate the implicit sequence points and model them as virtual reads of the listed symbols.

FIG. 3 presents another example of a portion 300 of computer program code in which implicit sequence points can be inserted into the computer program code. If conventional optimization were enabled during compilation and applied to this portion 300 of computer program code, the statement 310 storing the value "5" to the symbol "i", and the statement returning the square of "i" typically would be removed. Hence, the value "5" would not be stored to the symbol "i" in a compiled version of the computer program code. Instead, conventional optimization would store a value of 25 for the symbol "foo". In accordance with the present arrangements, however, by inserting an implicit sequence point at the beginning of the statement 310, a virtual read of the value "5" for the symbol "i" will be performed during a debug operation performed on the computer program code. Performance of the resulting executable might be slower at the benefit of materializing the store of the value "5" to the symbol "i", but debugging of the computer program will be facilitated.

If an implicit sequence point is inserted at the beginning of the statement 320, the square operation can be preserved as well. If not, the square operation can be inlined into the statement 330 by replacing "5*5" with the value "25" at compile time, and statement 330 can be removed, thereby still providing a level of optimization to the portion 300 of computer program code.

FIG. 4 presents another example of a portion 400 of computer program code in which implicit sequence points can be inserted into the computer program code. In this example the common sub expression "x*y" in statements 410, 420 can be identified. To avoid calculating "x*y" two times, during optimization a shadow variable can be assigned to the value "x*y", and this shadow variable can be used in the statements 410, 420. Moreover, part of the index calculation of the array "a" can be reused to deduce the outcome of the conditional statement 430. Any compiler internal variables also can be optimized. Accordingly, the conditional statement "2>t1 " need not be evaluated at compile time. Nonetheless, the values of symbols "t1 ", "t2", "q" and "z", still can be stored to memory when they are calculated, making them available to a debug operation when one or more suitable implicit sequence points are placed in the portion 400 of the computer program code, for example at the beginning of statements 410, 420 and 450.

Figure 5:
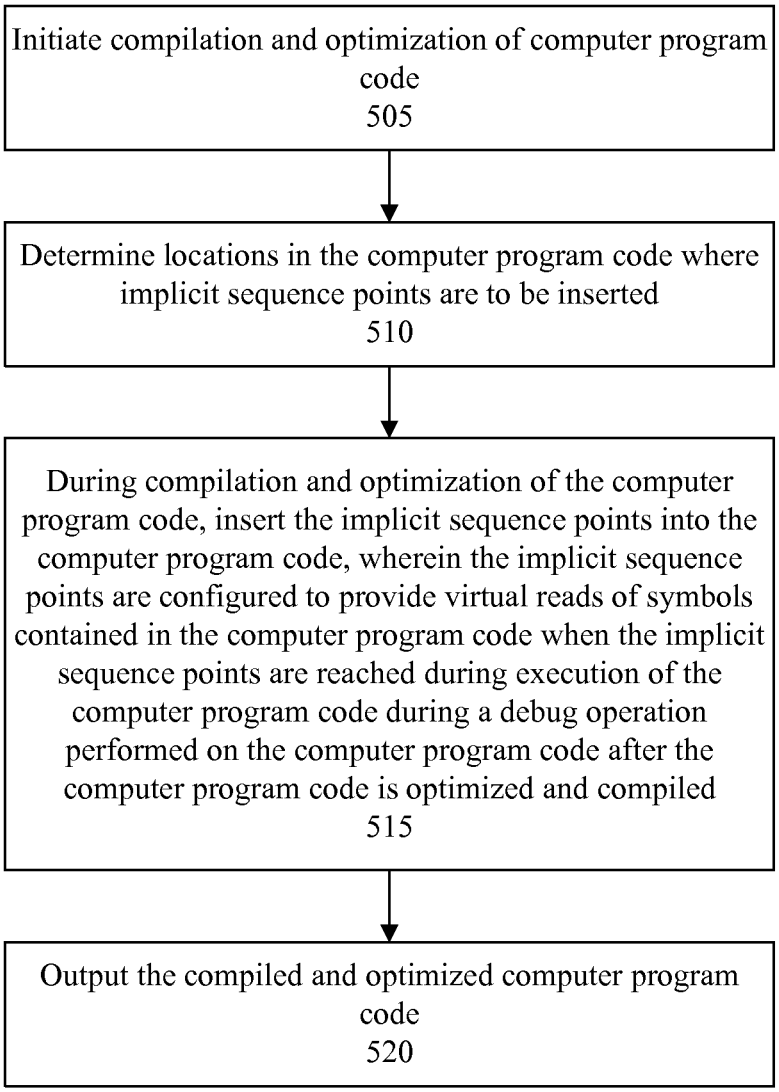
FIG. 5 is a flow chart illustrating a method of inserting implicit sequence points into computer program code in accordance with another embodiment disclosed within this specification.

FIG. 5 is a flow chart illustrating a method 500 of inserting implicit sequence points into computer program code in accordance with another embodiment disclosed within this specification. At step 505, compilation and optimization of computer program code can be initiated. For example, a user can initiate compilation via a user interface of a compiler, and select one or more options to optimize the computer program code. Further, the user can choose to have implicit sequence points inserted into the computer program code during compilation/optimization.

At step 510, a determination can be made where the implicit sequence points are to be inserted into the computer program code. For example, one or more user inputs can be received specifying where to insert the implicit sequence points, or the compiler can automatically choose where to insert the implicit sequence points, for example as previously described.

At step 515, during compilation and optimization of the computer program code, the implicit sequence points can be inserted into the computer program code, for example at the determined locations. The implicit sequence points can be configured to provide virtual reads of symbols contained in the computer program code when the implicit sequence points are reached during execution of the computer program code during a debug operation performed on the computer program code after the computer program code is optimized and compiled.

At step 520, the compiled and optimized computer program code can be output. If a user so chooses, the user can execute the compiled computer program code using a debugging application. During the debug operation, execution of the program code can be stopped, at least temporarily, at each of the implicit sequence points, and the implicit sequence points can provide virtual reads of symbols contained in the computer program code.

Figure 6:
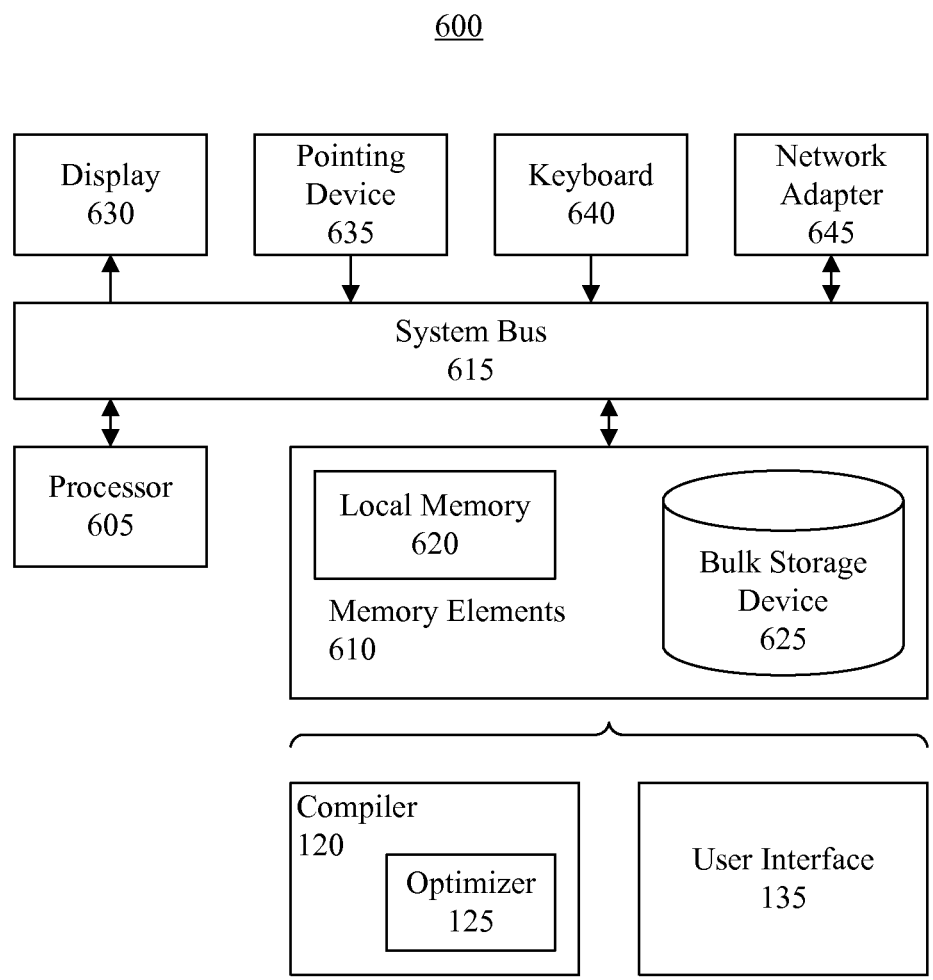
FIG. 6 is a block diagram illustrating a system for inserting implicit sequence points into computer program code in accordance with another embodiment disclosed within this specification.

FIG. 6 is a block diagram illustrating a processing system 600 for inserting implicit sequence points into computer program code in accordance with another embodiment disclosed within this specification. The processing system 600 can include at least one processor 605 (e.g., a central processing unit) coupled to memory elements 610 through a system bus 615 or other suitable circuitry. As such, the processing system 600 can store program code within the memory elements 610. The processor 605 can execute the program code accessed from the memory elements 610 via the system bus 615. It should be appreciated that the processing system 600 can be implemented in the form of any system including a processor and memory that is capable of performing the functions and/or operations described within this specification. For example, the processing system 600 can be implemented as a computer (e.g., a desktop computer, a laptop computer, a tablet computer, a workstation, a server, etc.)

The memory elements 610 can include one or more physical memory devices such as, for example, local memory 620 and one or more bulk storage devices 625. Local memory 620 refers to RAM or other non-persistent memory device(s) generally used during actual execution of the program code. The bulk storage device(s) 625 can be implemented as a hard disk drive (HDD), solid state drive (SSD), or other persistent data storage device. The processing system 600 also can include one or more cache memories (not shown) that provide temporary storage of at least some program code in order to reduce the number of times program code must be retrieved from the bulk storage device 625 during execution.

Input/output (I/O) devices such as a display 630, a pointing device 635 and, optionally, a keyboard 640 can be coupled to the processing system 600. The I/O devices can be coupled to the processing system 600 either directly or through intervening I/O controllers. For example, the display 630 can be coupled to the processing system 600 via a graphics processing unit (GPU), which may be a component of the processor 605 or a discrete device. One or more network adapters 645 also can be coupled to processing system 600 to enable processing system 600 to become coupled to other systems, computer systems, remote printers, and/or remote storage devices through intervening private or public networks. Modems, cable modems, transceivers, and Ethernet cards are examples of different types of network adapters 645 that can be used with processing system 600.

As pictured in FIG. 6, the memory elements 610 can store the components of the system 100 of FIG. 1, namely the compiler 120, optimizer 125 and the user interface 135. Being implemented in the form of executable program code, these components of the system 100 can be executed by the processing system 600 and, as such, can be considered part of the processing system 600. Moreover, the compiler 120, optimizer 125 and the user interface 135 are functional data structures that impart functionality when employed as part of the processing system of FIG. 6. Optionally, the memory elements 610 can store the computer program code 110 and, once the computer program code 110 is compiled, the compiled computer program code 130. The computer program code 110 and compiled computer program code 130 also may be stored elsewhere, for example on another system to which the processing system 600 is communicatively linked, for example via the network adapter(s) 645.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of inserting implicit sequence points into computer program code to support debug operations, the method comprising:

performing, using a processor, optimization of the computer program code during compilation of the computer program code and, during the optimization, inserting implicit sequence points into the computer program code, wherein the implicit sequence points are configured to provide virtual reads of symbols contained in the computer program code when the implicit sequence points are reached during execution of the computer program code during a debug operation performed on the computer program code after the computer program code is optimized and compiled, wherein a view of a user program remains valid by constraining the optimization using implicitly generated virtual reads of user visible symbols at the implicit sequence points and wherein, when a debugger stops at at least one of the sequence points, user visible symbols hold respective values in a same manner the user visible symbols would hold the respective values without optimization being performed on the computer program code; and configuring the computer program code to enable user modification of at least one respective value of at least one symbol when the debug operation is performed on the computer program code.

2. The method of claim 1, further comprising:

during the compilation of the computer program code, automatically determining locations in the computer program code where a user would want the implicit sequence points to be inserted into the computer program code based on a user experience provided by the computer program code, wherein inserting the implicit sequence points into the computer program code comprises inserting the implicit sequence points at the automatically determined locations.

3. The method of claim 1, wherein the implicit sequence points further provide virtual reads of indirect operations performed by the computer program code during execution of the computer program code, the indirect operations pertaining to operations that process at least one variable not specifically assigned in the computer program code.

4. The method of claim 1, wherein performing optimization of the computer program code comprises performing at least one level of optimization, the level of optimization selected from a group consisting of optimizing the computer program code to reduce an amount of time required to execute the computer program code and optimizing the computer program code to reduce an amount of memory utilized by the computer program code during operation.

5. The method of claim 1, wherein the implicit sequence points indicate points in the computer program code where execution is to be stopped, at least temporarily, during the debug operation.

6. The method of claim 1, wherein a number of the implicit sequence points inserted into the computer program code is a selected value within a predetermined range of values.

7. The method of claim 1, further comprising:

specifying a plurality of locations where the implicit sequence points are to be inserted into the computer program code in response to a user input received via a compiler configured to compile the computer program code;

wherein inserting implicit sequence points into the computer program code comprises inserting the implicit sequence points at the plurality of locations.

8. A method of inserting implicit sequence points into computer program code to support debug operations, the method comprising:

performing, using a processor, optimization of the computer program code during compilation of the computer program code and, during the optimization, inserting implicit sequence points into the computer program code, wherein the implicit sequence points are configured to provide virtual reads of symbols contained in the computer program code when the implicit sequence points are reached during execution of the computer program code during a debug operation performed on the computer program code after the computer program code is optimized and compiled, wherein a number of the implicit sequence points inserted into the computer program code is a selected value within a predetermined range of values in which a user is presented the predetermined range of values and prompted to select one of the values within the predetermined range.

* * * * *